United States Patent
Sato

(10) Patent No.: US 12,005,744 B2
(45) Date of Patent: Jun. 11, 2024

(54) TIRE

(71) Applicant: The Yokohama Rubber Co., LTD., Tokyo (JP)

(72) Inventor: Shun Sato, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 349 days.

(21) Appl. No.: 17/223,720

(22) Filed: Apr. 6, 2021

(65) Prior Publication Data

US 2021/0339572 A1    Nov. 4, 2021

(30) Foreign Application Priority Data

Apr. 30, 2020  (JP) .................. 2020-080847

(51) Int. Cl.
*B60C 11/13*    (2006.01)
*B60C 11/03*    (2006.01)

(52) U.S. Cl.
CPC ...... *B60C 11/1323* (2013.01); *B60C 11/0309* (2013.01)

(58) Field of Classification Search
CPC ............ B60C 11/1315; B60C 11/1323; B60C 11/1353; B60C 11/0309; B60C 2011/0346
See application file for complete search history.

(56) References Cited

U.S. PATENT DOCUMENTS

2021/0260930 A1    8/2021    Sato

FOREIGN PATENT DOCUMENTS

| DE | 11 2019 003 266 T5 | 3/2021 | |
|---|---|---|---|
| JP | H01-204805 A | 8/1989 | |
| JP | 2008-296795 A | 12/2008 | |
| JP | 2012111342 A * | 6/2012 | ............. B60C 11/01 |
| JP | 2017024687 A * | 2/2017 | ......... B60C 11/0309 |
| JP | 2020-055356 A | 4/2020 | |
| WO | 2017/217244 A1 | 12/2017 | |
| WO | WO 2020/045130 A1 | 3/2020 | |

OTHER PUBLICATIONS

English machine translation of JP-2012111342-A. (Year: 2012).*
English machine translation of JP-2017024687-A. (Year: 2017).*

* cited by examiner

*Primary Examiner* — Robert C Dye
(74) *Attorney, Agent, or Firm* — Thorpe North & Western

(57) ABSTRACT

In a tire, a main groove has a bend where the groove wall angle relative to the tread surface normal line changes in a meridian cross-section. In first and second blocks adjacent in a width direction with the main groove therebetween, an angle between a line extended from a ridge line formed by a bend of a first block side groove wall and a line extended from a lug groove wall defining the first block is larger than an angle between a line extended from the ridge line formed by a bend of the second block side groove wall and a line extended from a lug groove wall defining the second block, and an angle of the first block side groove wall to the tread surface normal line is smaller than an angle of the second block side groove wall to the tread surface normal line.

13 Claims, 12 Drawing Sheets

TIRE

CROSS-REFERENCE TO RELATED APPLICATIONS

This application claims priority pursuant to 35 U.S.C. 119(a) of Japan Patent Application No. 2020-080847, filed Apr. 30, 2020, which application is incorporated herein by reference in its entirety.

TECHNICAL FIELD

The present technology relates to a tire.

BACKGROUND ART

Among heavy duty tires, ultra-flat tires called ultra-wide base tires are sometimes used for waste collection vehicles and the like. This type of tire is required to have wear resistance performance and to improve the durability performance of the casing because of a large number of retreadings. One of the ways to improve the durability performance of the casing is to prevent stone drilling.

Heavy duty tires are used on various road surfaces, but when traveling on rough uneven ground with large stones scattered around, small stones can easily get caught in the grooves. Once the stones get caught, every time the tire comes into contact with the road surface, the stones are pushed toward the groove bottom and are hard to come off from the grooves. Thus, there is a problem that the stones present in the groove cause a failure such as a crack at the groove bottom and damage a tread portion. A technique for preventing such stone drilling is disclosed in International Patent Publication No. WO 2017/217244.

In the tire of International Patent Publication No. WO 2017/217244, either one or both sides of the groove wall of the main groove are configured with a ground contact surface-side angle and a groove bottom-side angle relative to the groove vertical direction with an inflection point as a boundary, and the groove wall is formed so that the latter angle is greater than the former angle.

However, the technique disclosed in International Patent Publication No. WO 2017/217244 has room for improvement in improving the performance of preventing stone drilling (hereinafter referred to as "stone drilling resistance performance") while improving the wear resistance performance.

SUMMARY

The present technology provides a tire capable of improving the wear resistance performance and the stone drilling resistance performance.

A tire according to an aspect of the present technology includes: a plurality of main grooves extending in a tire circumferential direction; a land portion defined by the main grooves; a plurality of lug grooves passing through the land portion; and a plurality of blocks defined by the plurality of main grooves and the plurality of lug grooves, each of the plurality of blocks including at least one bend point and having a bent shape that projects inward of the blocks, the main grooves having a bend point at which an angle of a groove wall with respect to a normal line of a tread surface changes in a meridian cross-section, and in a first block and a second block, among the plurality of blocks, that are adjacent to each other in a tire width direction with the main grooves interposed therebetween, in a plan view of the tread surface, an angle between a line extended from a ridge line formed by the bend point of a groove wall on the first block side of the main groove between the first block and the second block and a line extended from a groove wall of the lug groove defining the first block being larger than an angle between a line extended from a ridge line formed by the bend point of a groove wall on the second block side of the main groove between the first block and the second block and a line extended from a groove wall of the lug groove defining the second block, and in a meridian cross-section, an angle of the groove wall on the first block side of the main groove between the first block and the second block with respect to a normal line of the tread surface being smaller than an angle of the groove wall on the second block side of the main groove between the first block and the second block with respect to a normal line of the tread surface.

Preferably, in a plan view of the tread surface, a ratio of a distance between the ridge lines of the wall surfaces to a maximum distance between opposing wall surfaces of the main groove is 0.15 or more and 0.35 or less.

Preferably, in a plan view of the tread surface, an angle between a line extended from an end portion on the first block side of the main groove and a line extended from a groove wall of the lug groove defining the first block is 90 degrees or more and 150 degrees or less, and an angle between a line extended from an end portion on the second block side of the main groove and a line extended from a groove wall of the lug groove defining the second block is 20 degrees or more and 60 degrees or less.

Preferably, in a plan view of the tread surface, a ratio L2/L1 of a length L2 of a section in which an angle of a groove wall on the first block side of the main groove is constant with respect to a length L1 in the tire circumferential direction of an edge on the second block side of a road contact surface of the first block is 0.15 or more and 0.70 or less, and a position of a midpoint of the section of length L2 is included in a position of 40% to 60% of the length L1 between one end portion and an other end portion of both end portions of the length L1.

Preferably, in a meridian cross-section, a difference in angle of the groove walls on both sides in an extension direction of the main groove in the section of length L2 is 5 degrees or less.

Preferably, a first lug groove and a second lug groove are adjacent to each other in the tire circumferential direction with the first block interposed therebetween, in a plan view of the tread surface, a difference between an angle between a line extended from a ridge line of a groove wall on the first block side of the main groove between the first block and the second block and a line extended from a groove wall of the first lug groove and an angle between a line extended from an end portion on the first block side of the main groove and a line extended from a groove wall of the first lug groove is 0 degrees or more and 10 degrees or less, and in a plan view of the tread surface, a difference between an angle between a line extended from a ridge line of a groove wall on the first block side of the main groove between the first block and the second block and a line extended from a groove wall of the second lug groove and an angle between a line extended from an end portion on the first block side of the main groove and a line extended from a groove wall of the second lug groove is 20 degrees or more and 40 degrees or less.

Preferably, in a meridian cross-section, when a groove depth of the main groove is D, and an imaginary dividing line parallel with a straight line that connects groove opening end portions is drawn to a position at D/2 so that an outer side in the tire radial direction and an inner side in the tire radial direction are divided, a ratio SD/SU of a cross-sectional area SD on the inner side in the tire radial direction to a cross-sectional area SU on the outer side in the tire radial direction is less than 0.5.

Preferably, in a meridian cross-section, when a groove depth of the main groove is D and a depth from the tread surface to the bend point is $D_E$, the ratio $D_E/D$ is 0.60 or more and 0.80 or less.

The tire according to an embodiment of the present technology can improve the wear resistance performance and the stone drilling resistance performance.

DETAILED DESCRIPTION

Embodiments of the present technology are described in detail below with reference to the drawings. In the embodiments described below, identical or substantially similar components to those of other embodiments have identical reference signs, and descriptions of those components are either simplified or omitted. The present technology is not limited by the embodiments. Constituents of the embodiments include elements that are essentially identical or that can be substituted or easily conceived by one skilled in the art. Note that it is possible to combine the configurations described below as desired. Moreover, various omissions, substitutions, and changes to the configurations can be carried out within the scope of the present technology.

Figure 1:
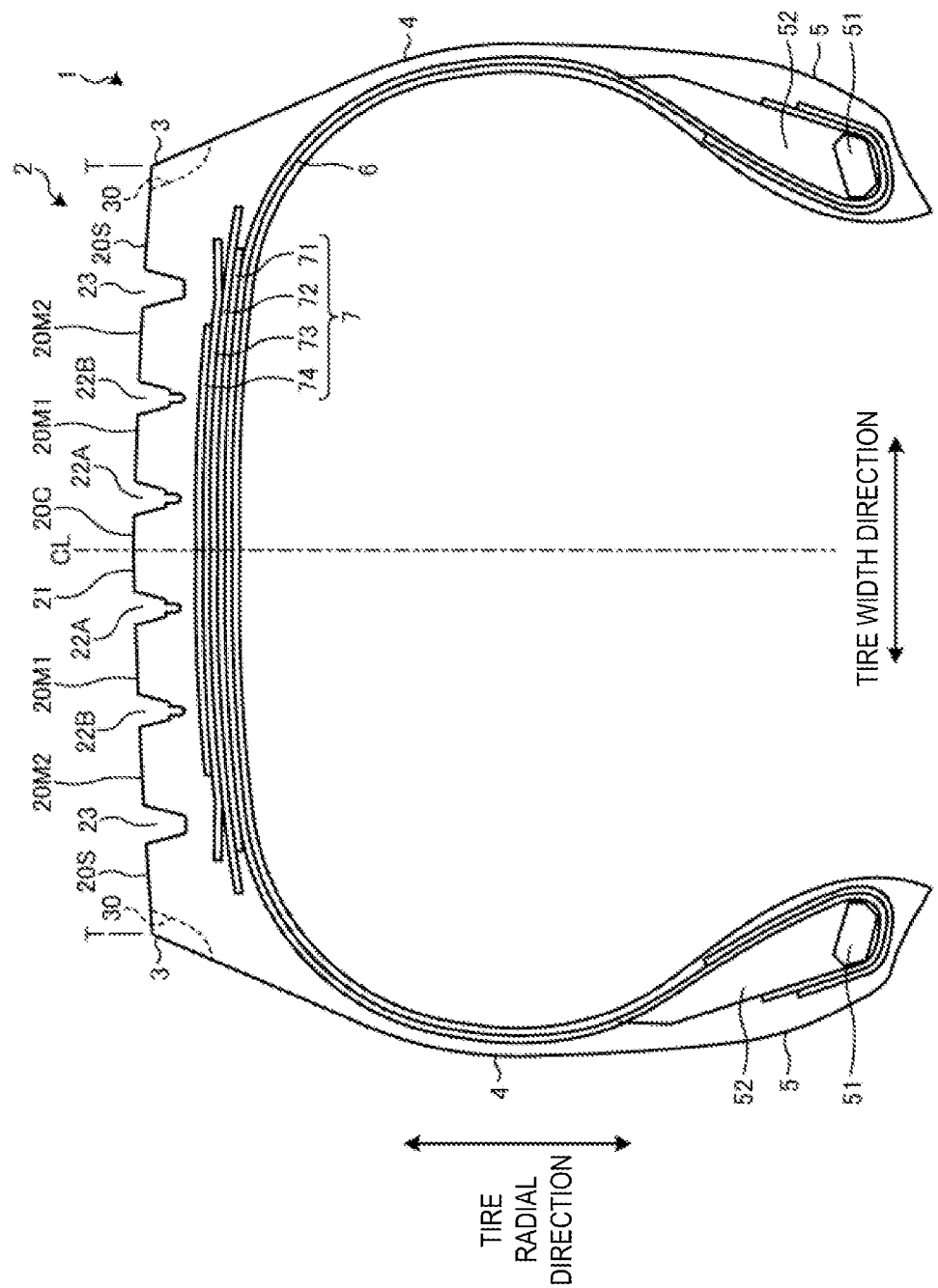
FIG. 1 is a meridian cross-sectional view of a tire according to an embodiment.
Figure 2:
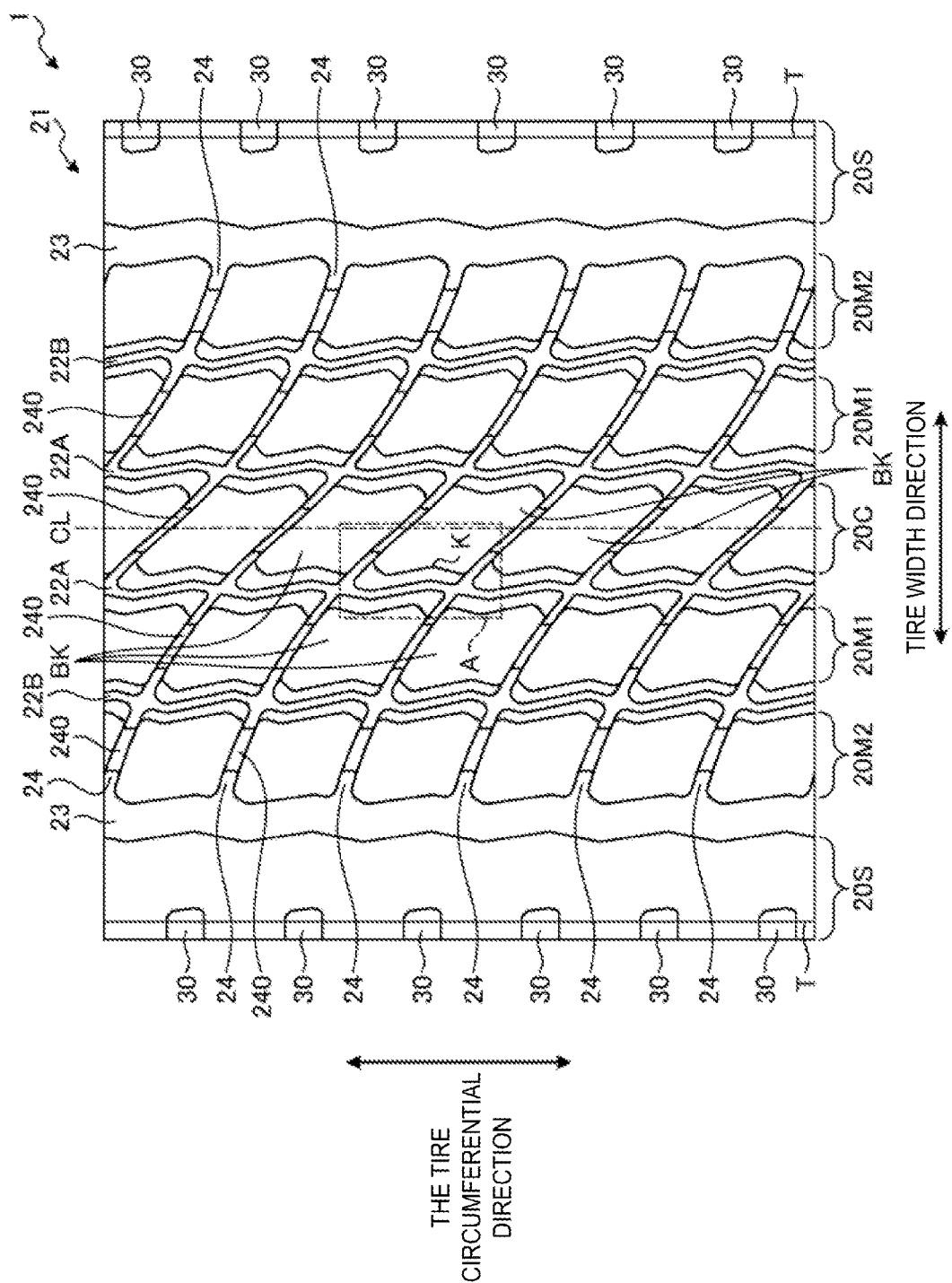
FIG. 2 is a plan view illustrating a tread surface of the tire according to the present embodiment.

FIG. 1 is a meridian cross-sectional view of a tire 1 according to the present embodiment. FIG. 2 is a plan view of a tread surface of the tire 1 according to the present embodiment. Additionally, the tire 1 of the present embodiment is preferably a pneumatic tire. Inert gases such as nitrogen, argon, and helium in addition to ordinary air or air with an adjusted oxygen partial pressure can be used as the gas to be filled in the tire 1.

In the description below, the tire meridian cross-section is defined as a cross-section of the tire taken along a plane that includes the tire rotation axis (not illustrated). The tire radial direction refers to a direction orthogonal to the rotation axis (not illustrated) of the tire 1, the inner side in the tire radial direction refers to the side facing the rotation axis in the tire radial direction, and the outer side in the tire radial direction refers to the side away from the rotation axis in the tire radial direction. Moreover, the tire circumferential direction refers to the circumferential direction with the rotation axis as the central axis. Additionally, the tire width direction refers to a direction parallel with the rotation axis, the inner side in the tire width direction refers to a side toward the tire equatorial plane (tire equator line) CL in the tire width direction, and the outer side in the tire width direction refers to a side away from the tire equatorial plane CL in the tire width direction. The tire equatorial plane CL is a plane that is orthogonal to the rotation axis of the tire 1 and passes through the center of the tire width of the tire 1, and in the tire equatorial plane CL, the center line in the tire width direction, which is the center position of the tire 1 in the tire width direction, coincides with the position in the tire width direction. "Tire width" is the width in the tire width direction between portions located on the outermost side in the tire width direction, or in other words, the distance between the portions that are the most distant from the tire equatorial plane CL in the tire width direction. "Tire equator line" refers to the line in the tire circumferential direction of the tire 1 that lies on the tire equatorial plane CL. In the present embodiment, the tire equator line and the tire equatorial plane are denoted by the same reference sign CL.

As illustrated in FIG. 1, the tire 1 of the present embodiment includes a tread portion 2, shoulder portions 3 on both outer sides in the tire width direction of the tread portion 2, and sidewall portions 4 and bead portions 5 continuously formed in that order from the shoulder portions 3. Furthermore, the tire 1 includes a carcass layer 6 and a belt layer 7.

In FIG. 1, the shoulder portions 3 are portions of the tread portion 2 located on both outer sides in the tire width direction. Additionally, the sidewall portions 4 are exposed on the outermost sides of the tire 1 in the tire width direction. The bead portions 5 each include a bead core 51 and a bead filler 52. The bead core 51 is formed by winding a bead wire, which is a steel wire, into an annular shape. The bead filler 52 is a rubber material disposed in a space formed when an end portion in the tire width direction of the carcass layer 6 is folded back toward the outer side in the tire width direction at the position of the bead core 51.

The end portions of the carcass layer 6 in the tire width direction are folded back around the pair of bead cores 51 from an inner side in the tire width direction to an outer side in the tire width direction, and the carcass layer 6 is stretched in a toroidal shape in the tire circumferential direction to form the framework of the tire. The carcass layer 6 is made of coating rubber-covered carcass cords (not illustrated) disposed side by side with an angle with respect to the tire circumferential direction along the tire meridian direction at an angle with respect to the tire circumferential direction. The carcass cords are made of steel or organic fibers (polyester, rayon, nylon, or the like).

The belt layer 7 has a multilayer structure in which four layers of belts 71, 72, 73, 74 are layered, for example, and in the tread portion 2, is disposed on the outer side in the tire radial direction, which is the outer circumference, of the carcass layer 6, covering the carcass layer 6 in the tire circumferential direction. The belts 71, 72, 73, 74 are made of coating rubber-covered cords (not illustrated) disposed side by side at a predetermined angle with respect to the tire circumferential direction. The cords are made of steel or organic fibers (polyester, rayon, nylon, or the like).

The tread portion 2 is made of a rubber material (tread rubber) and is exposed on the outermost side of the tire 1 in the tire radial direction, with the surface thereof constituting the contour of the tire 1. A tread surface 21 is formed on an outer circumferential surface of the tread portion 2, in other words, on a road contact surface that comes into contact with a road surface when running. A plurality (six in the present embodiment) of circumferential main grooves 22A, 22B, 23 that extend in the tire circumferential direction are provided in the tread surface 21. A plurality (seven in the present embodiment) of land portions 20C, 20M1, 20M2, 20S defined by the plurality of circumferential main grooves 22A, 22B, 23, extending in the tire circumferential direction, and arranged in the tire width direction are provided in the tread surface 21.

The circumferential main groove 22A is the circumferential main groove closest to the tire equator line CL. The circumferential main groove 22B is the circumferential main groove that is second closest to the tire equator line CL. The circumferential main groove 22B is the circumferential main groove provided on the outer side in the tire width direction of the circumferential main groove 22A. The circumferential main groove 23 is the circumferential main groove provided on the outer side in the tire width direction of the circumferential main groove 22B. The circumferential main groove 23 is the circumferential main groove closest to the tire ground contact edge T. "Main groove" refers to a groove on which a wear indicator must be provided as specified by JATMA (The Japan Automobile Tyre Manufacturers Association, Inc.).

The land portion 20C is provided between the circumferential main grooves 22A, 22A adjacent to each other with the tire equator line CL interposed therebetween. The land portion 20C is defined by two circumferential main grooves 22A and 22A. The land portion 20M1 is provided between the circumferential main groove 22A and the circumferential main groove 22B. The land portion 20M1 is divided by the circumferential main groove 22A and the circumferential main groove 22B. The land portion 20M2 is provided between the circumferential main groove 22B and the circumferential main groove 23. The land portion 20M2 is divided by the circumferential main groove 22B and the circumferential main groove 23. The land portion 20S is provided on the outer side of the circumferential main groove 23 in the tire width direction. In the following description, the circumferential main groove may be simply referred to as a "main groove".

Tread Portion

The details of the tread portion 2 will be described. In the following description, the groove depth is the maximum distance from the tread surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

As illustrated in FIG. 2, the tread portion 2 has lug grooves 24. The lug grooves are lateral grooves extending in the tire width direction, and open when the tire comes into contact with the ground, and function as grooves. The lug grooves 24 extend in a direction intersecting the circumferential main grooves 22A, 22B, and are provided side by side in the tire circumferential direction. Each lug groove 24 extends in the tire width direction from one main groove 23 to the other main groove 23. Each lug groove 24 extends in the tire width direction from one of the main grooves 23, passes through the land portion 20M2, the land portion 20M1, the land portion 20C, the land portion 20M1, and the land portion 20M2, and opens to the other main groove 23.

The land portion 20C includes lug grooves 24 that are connected to the circumferential main grooves 22A and the circumferential main grooves 22B to connect the circumferential main grooves 22A and the circumferential main grooves 22B. The land portion 20S is defined on the outer side in the tire width direction of the circumferential main groove 23, and is disposed on the outermost side in the tire width direction of the tread portion 2. The land portion 20S includes lug grooves 30 on the edge portion on the outer side in the tire width direction. The lug grooves 30 are provided in the land portions 20S at a predetermined pitch in the tire circumferential direction. The end portion of the lug groove 30 on the side closer to the tire equatorial plane CL terminates in the land portion 20S. The end portion of the lug groove 30 on the side away from the tire equatorial plane CL extends beyond the tire ground contact edge T in the tire width direction and opens to the shoulder portion 3.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static and unloaded state, and loaded with a load corresponding to the specified load.

"Specified rim" refers to a "standard rim" defined by JATMA, a "Design Rim" defined by TRA (The Tire and Rim Association, Inc.), or a "Measuring Rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

As illustrated in FIG. 2, in this example, in the land portion 20C of the tread portion 2, a plurality of blocks BK are defined by the circumferential main grooves 22A, 22B, 23 and the lug grooves 24 extending in the tire width direction. As illustrated in FIG. 2, the circumferential main grooves 22A, 22B, and 23 have a zigzag shape having an amplitude in the tire width direction.

In the lug groove 24, a raised bottom portion 240 is provided between the blocks BK adjacent to each other in the tire circumferential direction. The raised bottom portion 240 is a portion in which the groove bottom is raised to make the groove shallower than other portions.

Block

The tread portion 2 includes a plurality of blocks BK. Each block BK is defined by a plurality of main grooves 22A, 22B, 23 and a plurality of lug grooves 24. Each block BK has at least one bend point K. Therefore, the block BK has a bent shape that projects inward of the block BK in a plan view. Each block BK may have a plurality of bend points K.

Figure 3:
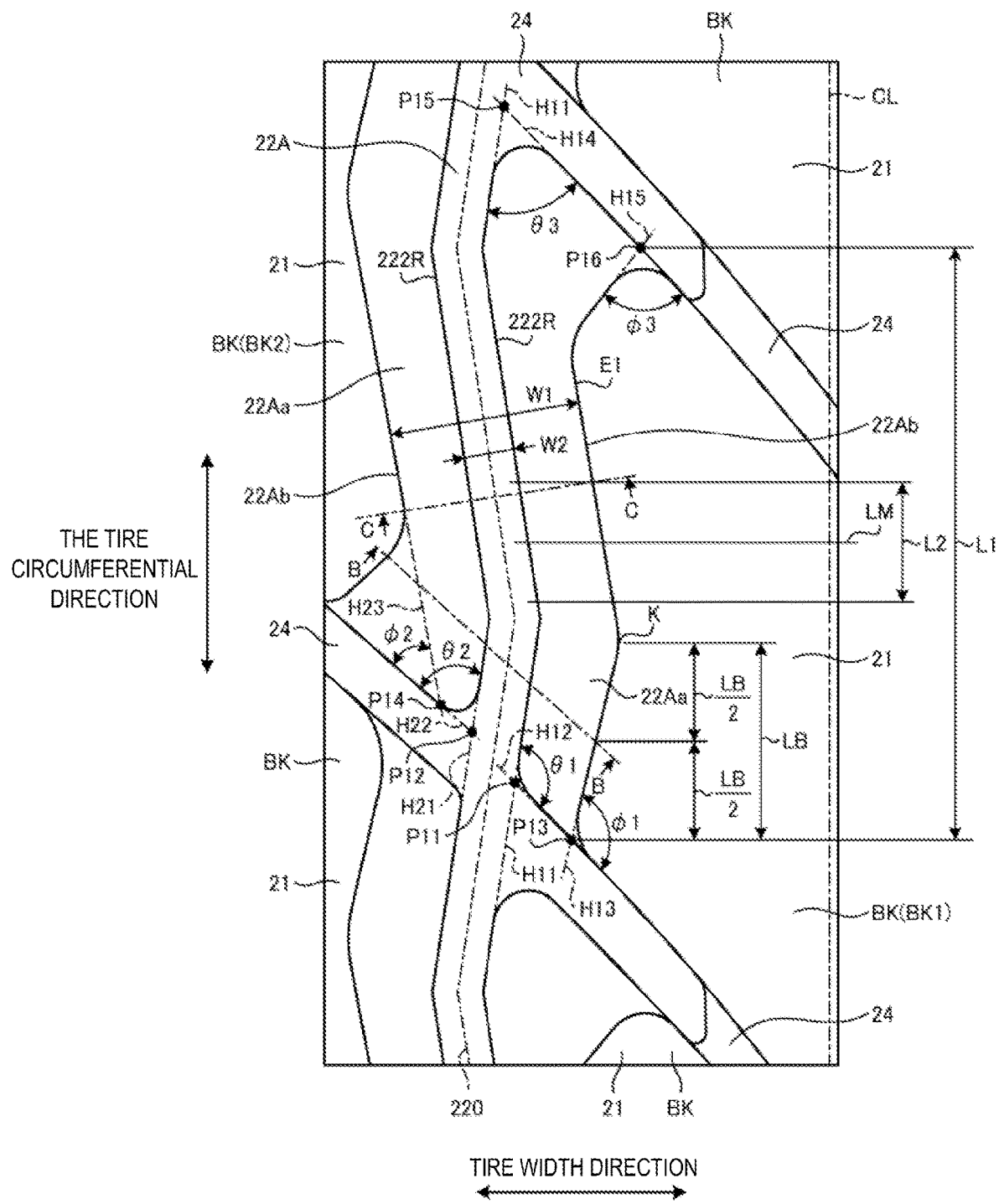
FIG. 3 is an enlarged view of the region A in FIG. 2.

FIG. 3 is an enlarged view of the region A in FIG. 2. FIG. 3 illustrates a portion of a first block BK1 and a portion of a second block BK2, among the plurality of blocks BK constituting the tread surface 2, that are adjacent to each other in the tire width direction with the main groove 22A interposed therebetween.

As illustrated in FIG. 3, the first block BK1 is closer to the equator line CL than the second block BK2 in the tire width direction. In a plan view of the tread surface 21, the groove wall on the first block BK1 side of the main groove 22A between the first block BK1 and the second block BK2 has a bend point described later. A ridge line 222R is formed by the bend point of the groove wall. A line H11 extended from the ridge line 222R and a line H12 extended from the groove wall of the lug groove 24 defining the first block BK1 intersect at the point P11. The angle between the line H11 and the line H12 is defined as θ1. Further, a line H21 extended from the ridge line 222R formed by the bend point of the groove wall on the second block BK2 side of the main groove 22A between the first block BK1 and the second block BK2 and a line H22 extended from the groove wall of the lug groove 24 defining the second block BK2 intersect at the point P12. The angle between the line H21 and the line H22 is defined as θ2. At this time, the angle θ1 is greater than the angle θ2.

Meridian Cross-Section of Main Groove

Figure 4:
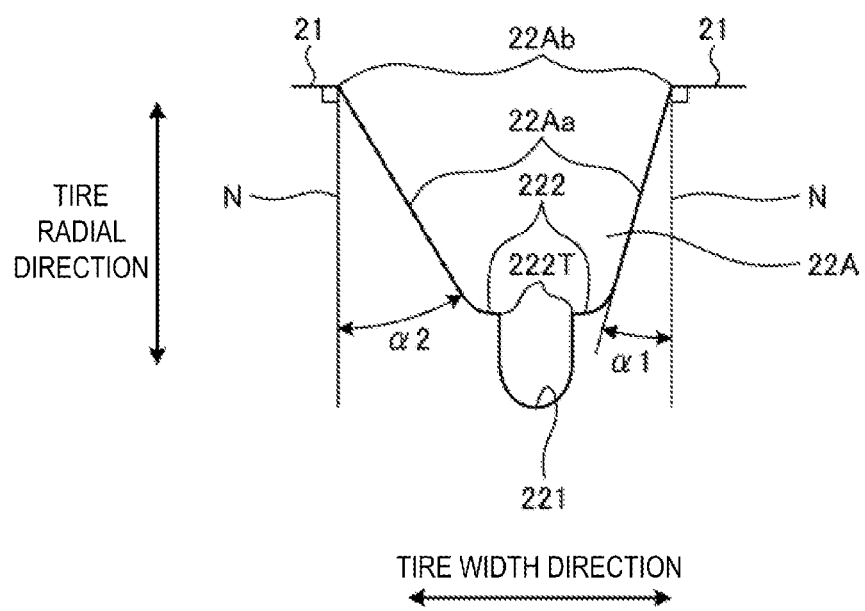
FIG. 4 is a diagram illustrating an example of the structure of a main groove.

FIG. 4 is a diagram illustrating the structure of the main groove 22A. FIG. 4 is a diagram illustrating a meridian cross-section of the B-B portion in FIG. 3. FIG. 4 illustrates the structure of the main groove 22A between the first block BK1 and the second block BK2. The length from the bend point K of the block BK1 to the point P13 which is the intersecting point of the main groove 22A and the lug groove 24 is defined as the length LB. The B-B portion in FIG. 3 passes through the position of the midpoint (LB/2) of the length LB. When a plurality of bend points K are present, the length from the bend point K closest to the lug groove 24 to the point P13 is defined as the length LB.

As illustrated in FIG. 4, a step portion 222 is provided between the groove opening end portion 22Ab of the main groove 22A to the tread surface 21 and the groove bottom 221. The end 222T on the groove center side of the step portion 222 is a bend point at which the angle of the groove wall 22Aa with respect to the normal line N of the tread surface 21 changes in the meridian cross-section. That is, the groove wall 22Aa has a bend point. The bend point due to the end portion 222T in FIG. 4 which is a cross-sectional view of the main groove 22A is visible as the ridge line 222R in FIG. 3 which is a plan view.

Here, in FIG. 4, the angle of the groove wall 22Aa on the first block BK1 side of the main groove 22A with respect to the normal line N of the tread surface 21 is defined as α1. Further, the angle of the groove wall 22Aa on the second block BK2 side of the main groove 22A with respect to the normal line N of the tread surface 21 is defined as α2. At this time, the angle α1 is smaller than the angle α2. It is preferable that the angle α1 is smaller than the angle α2 in the entire region of the main groove 22A without being limited to the B-B portion in FIG. 3.

As described above, the angle θ1 is greater than the angle θ2, and the angle α1 is smaller than the angle α2. In this way, by making the angle α2 of the groove wall 22Aa of the second block BK2 having an acute angle θ2 in the tread plan view greater than the angle α1 of the groove wall 22Aa of the first block BK1, it is possible to suppress the collapse of the edge portion of the second block BK2 and improve the block rigidity. The angle θ1 is, for example, 90 degrees or more and 140 degrees or less, the angle θ2 is, for example, 40 degrees or more and less than 90 degrees, and the difference between the angle α1 and the angle α2 is, for example, 3 degrees or more and 20 degrees or less.

Returning to FIG. 3, in the plan view of the tread surface 21, the maximum distance between the groove walls 22Aa, 22Aa of the main groove 22A that are opposite is defined as W1. The distance W1 corresponds to the distance between the groove opening end portions 22Ab and 22Ab. Further, the distance between the ridge lines 222R due to the end portions 222T of the opposing wall surfaces is defined as W2. The distance W1 and the distance W2 are distances in a direction orthogonal to the extension direction of the groove center line 220. The groove center line 220 is an imaginary line connecting the midpoints of the distance between the groove walls 22Aa, 22Aa of the main groove 22A that are opposite. For the portion where the wall surface of the main groove 22A is not present due to the intersection with the lug groove 24, the wall surface is supplemented by the lines H11 and H21 and the groove center line 220 is assumed. The groove center line 220 has a zigzag shape.

At this time, the ratio W2/W1 of the distance W2 to the distance W1 is preferably 0.15 or more and 0.35 or less. When the ratio W2/W1 is within this range, the wear resistance and the stone drilling resistance performance can be improved. The ratio W2/W1 is more preferably 0.15 or more and 0.30 or less. It is not preferable that the ratio W2/W1 is less than 0.15. This is because a curved surface cannot be secured at the groove bottom of the main groove 22A, and there is a high possibility that groove cracks will occur.

In a plan view of the tread surface 21, a line H13 extended from the groove opening end portion 22Ab on the first block BK1 side of the main groove 22A and a line H12 extended from the groove wall of the lug groove 24 defining the first block BK1 intersect at the point P13. The angle φ1 between the line H13 and the line H12 is preferably 90 degrees or more and 150 degrees or less. When the angle φ1 is within this range, the wear resistance and the stone drilling resistance performance can be improved. If the angle φ1 is less than 90 degrees, the distortion at the edge portion of the first block BK1 becomes large, which is not preferable. If the angle φ1 exceeds 150 degrees, an appropriate shape of the first block BK1 cannot be obtained, which is not preferable. The angle φ1 is more preferably 90 degrees or more and 120 degrees or less.

Further, a line H23 extended from the groove opening end portion 22Ab on the second block BK2 side of the main groove 22A and a line H22 extended from the groove wall of the lug groove 24 defining the second block BK2 intersect at the point P14. The angle φ2 between the line H23 and the line H22 is preferably 20 degrees or more and 60 degrees or less. If the angle φ2 is within this range, the wear resistance and the stone drilling resistance performance can be improved. The angle φ2 is more preferably 30 degrees or more and 50 degrees or less. The angle φ2 is more preferably 40 degrees.

In the plan view of the tread surface 21, the length of the edge E1 on the second block BK2 side of the road contact surface of the tread surface 21 of the first block BK1 in the tire circumferential direction is defined as L1. The length L1 is the length between the points P13 and P16 in the tire circumferential direction. The point P16 is a point where the line H15 extended from the end portion of the main groove 22A on the first block BK1 side and the line H14 extended from the groove wall of the lug groove 24 intersect. It is preferable that the angle of the groove wall on the block BK1 side of the main groove 22A is constant in a section of length L2 that is between one end portion and an other end portion of both end portions of the length L1. In this example, one end of the length L2 is at a position of 40% of the length L1 from the point P13, and the other end of the length L2 is at a position of 60% of the length L1 from the point P13. Therefore, in this example, the midpoint of the section of length L2 is located at 50% of the length L1, that is, at a position LM of the midpoint of the length L1, and the length L2 is 20% the length of the length L1. That is, in this example, the ratio L2/L1 of the length L2 to the length L1 is 0.20. The ratio L2/L1 is preferably 0.15 or more and 0.70 or less. The position of the midpoint of the section of length L2 is preferably included in a position of 40% to 60% of the length L1 between one end portion and an other end portion of both end portions of the length L1.

That is, the ratio L2/L1 of the length L2 of the section where the angle of the groove wall on the first block BK1 side of the main groove 22A is constant with respect to the length L1 between both end portions of the road contact surface of the block in the tire circumferential direction is 0.15 or more and 0.70 or less, and the section of length L2 is included in a position of 40% (that is, 0.4) to 60% (that is, 0.6) of the length L1 between one end portion (for example, the point P13 on the angle φ1 side) and an other end portion (for example, the point P16 on the angle φ3 side) of both end portions of the length L1. If the change in angle is 5% or less in the section of length L2, the angle of the groove wall can be considered to be constant. By reducing the change in the angle of the groove wall of the main groove 22A in the section of length L2, it is possible to suppress the non-uniform movement of the first block BK1 and improve the wear resistance performance.

Figure 5:
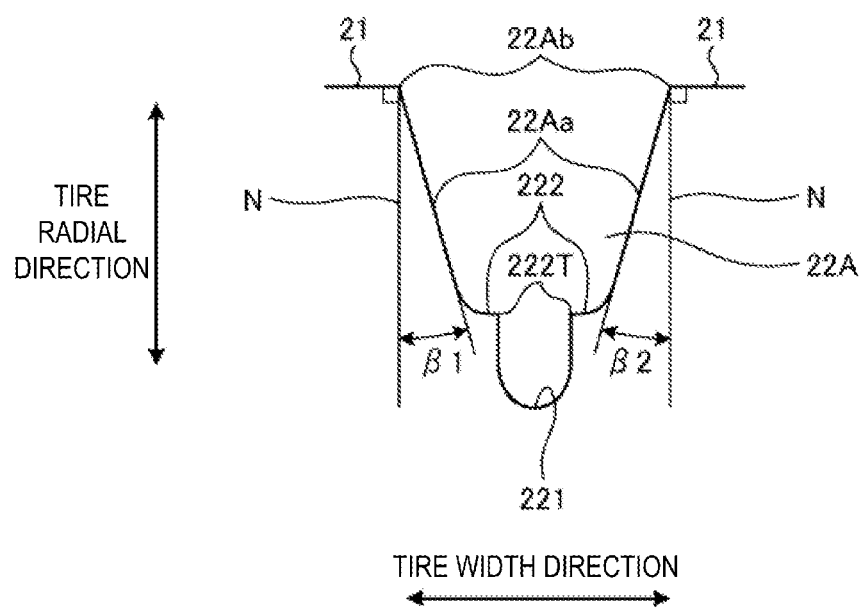
FIG. 5 is a diagram illustrating an example of the structure of a main groove.

FIG. 5 is a diagram illustrating an example of the structure of the main groove 22A. FIG. 5 is a diagram illustrating a meridian cross-section of the C-C portion in FIG. 3. As illustrated in FIG. 5, the angles of the groove walls 22Aa on both sides of the main groove 22A in the section of length L2 in the extension direction with respect to the normal line N are defined as β1 and β2. The difference between the angle β1 and the angle β2 is preferably 5 degrees or less. By reducing the change in the angle of the groove wall 22Aa, it is possible to suppress the non-uniform movement of the first block BK1 and the second block BK2 and improve the wear resistance performance. The difference between the angle β1 and the angle β2 is more preferably 3 degrees or less.

Referring to FIG. 3 again, the lug groove 24 and the lug groove 24 are adjacent to each other in the tire circumferential direction with the first block BK1 interposed therebetween. The difference between the angle θ1 between the line H11 extended from the ridge line of the groove wall on the first block BK1 side of the main groove 22A between the first block BK1 and the second block BK2 and the line H12 extended from the groove wall of the lug groove 24, and the angle φ1 between the line H13 extended from the end portion of the main groove 22A on the first block BK1 side and the line H12 extended from the groove wall of the lug groove 24 is preferably 0 degrees or more and 10 degrees or less. When the difference in angle is within this range, it is possible to suppress the non-uniform movement of the first block BK1 and improve the wear resistance performance.

Further, the line H11 extended from the ridge line of the groove wall on the first block BK1 side of the main groove 22A and the line H14 extended from the groove wall of the lug groove 24 intersect at the point P15. The line H15 extended from the end portion of the main groove 22A on the first block BK1 side and the line H14 extended from the groove wall of the lug groove 24 intersect at the point P16. The difference between the angle θ3 between the line H11 and the line H14 and the angle φ3 between the line H15 and the line H14 is preferably 20 degrees or more and 40 degrees or less. When the difference in angle is within this range, it is possible to suppress the non-uniform movement of the first block BK1 and improve the wear resistance performance.

Here, referring to FIGS. 3 and 4, focusing on the portion where the main groove 22A and the lug groove 24 intersect in the first block BK1, the region from the ridge line 222R to the groove opening end portion 22Ab is the groove wall surface of the main groove 22A and is also a chamfered portion of the lug groove 24 in the vicinity of the lug groove 24. The groove wall surface of the main groove 22A and the chamfered portion of the lug groove 24 are smoothly connected, and the boundary thereof is not clear.

Figure 6:
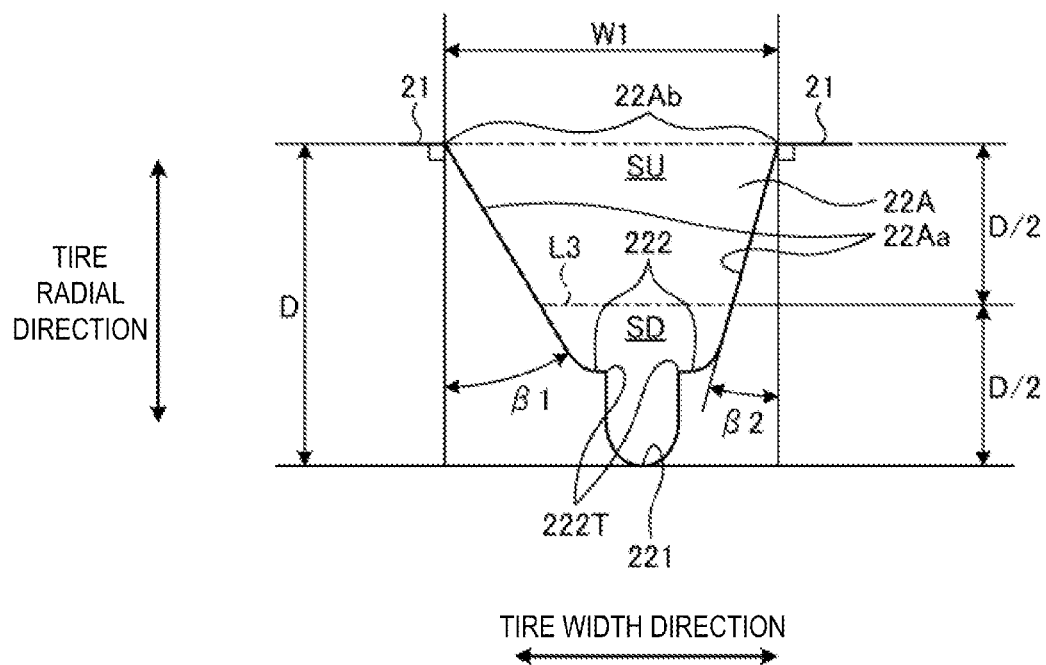
FIG. 6 is a diagram illustrating an example of the structure of a main groove.
Figure 7:
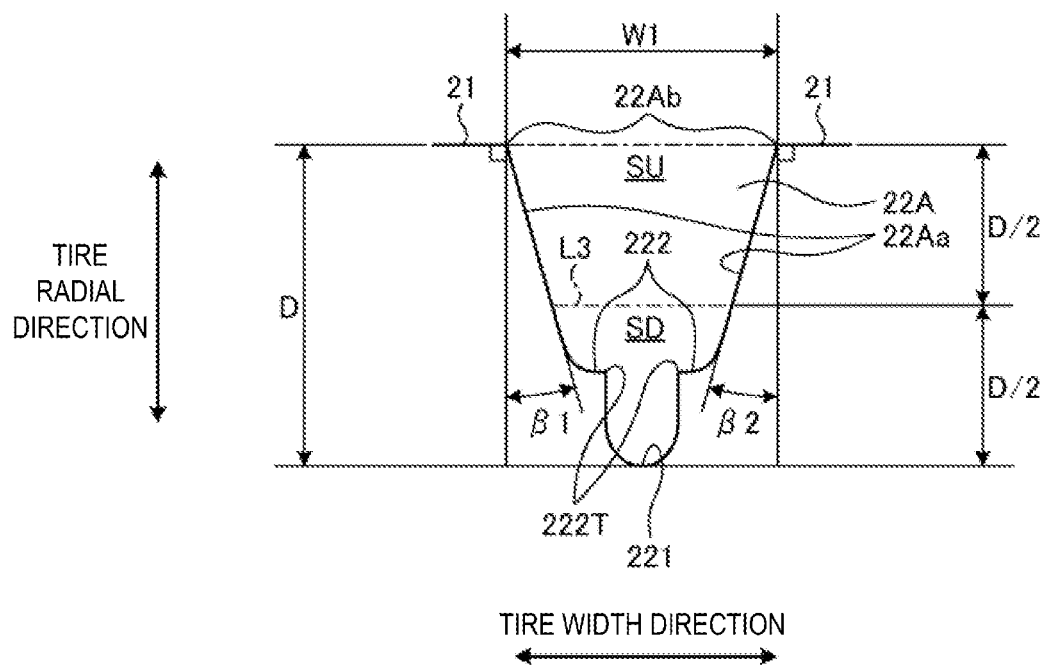
FIG. 7 is a diagram illustrating an example of the structure of a main groove.
Figure 8:
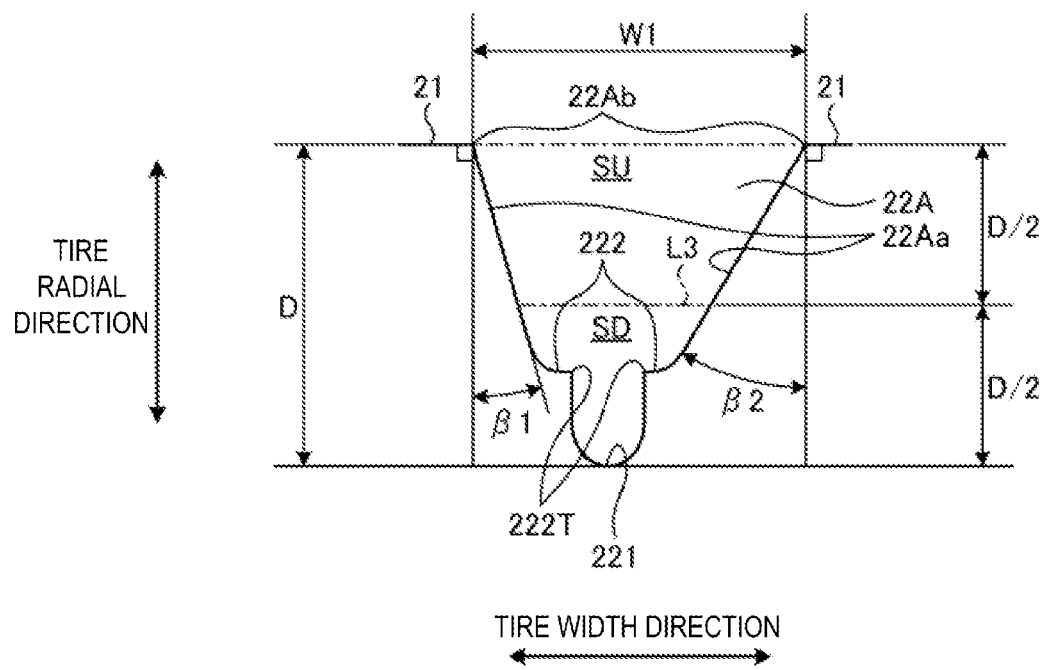
FIG. 8 is a diagram illustrating an example of the structure of a main groove.

FIGS. 6 to 8 are views illustrating an example of the structure of the main groove 22A. FIGS. 6 to 8 are meridian cross-sectional views of the circumferential main groove 22A in FIG. 3. FIG. 7 is a cross-sectional view of the C-C portion in FIG. 3. As illustrated in FIGS. 6 to 8, the circumferential main groove 22A has the step portion 222 on the groove wall 22Aa between the tread surface 21 and the groove bottom 221. The step portion 222 extends in the tire circumferential direction. The step portion 222 is provided on at least one groove wall 22Aa. The step portion 222 forms an inflection portion in which the groove wall angles β1 and β2 of the groove wall 22Aa change from the groove opening end portion 22Ab of the circumferential main groove 22A toward the groove bottom. In the circumferential main groove 22A, the groove wall angles β1 and β2 with respect to the normal line of the tread surface 21, of the groove wall 22Aa from the tread surface 21 which is the groove opening end portion 22Ab to the step portion 222 toward the groove bottom 221 are preferably 10 degrees or more and 45 degrees or less. In FIG. 6, the groove wall angle β1 is, for example, 30 degrees, and the groove wall angle β2 is, for example, 15 degrees. In FIG. 7, the groove wall angle β1 is, for example, 15 degrees, and the groove wall angle β2 is, for example, 15 degrees. In FIG. 8, the groove wall angle β1 is, for example, 15 degrees, and the groove wall angle β2 is, for example, 30 degrees.

As illustrated in FIGS. 6 to 8, in the meridian cross-section, an imaginary dividing line L3 parallel to the straight line connecting the groove opening end portions 22Ab is drawn to the ½ position (D/2) of the groove depth D so that the outer side in the tire radial direction and the inner side in the tire radial direction are divided. At this time, the ratio SD/SU of a cross-sectional area SD on the inner side in the tire radial direction to a cross-sectional area SU on the outer side in the tire radial direction is preferably less than 0.5. If the ratio SD/SU is less than 0.5, the stone drilling resistance performance of the main groove 22A can be improved.

Figure 9:
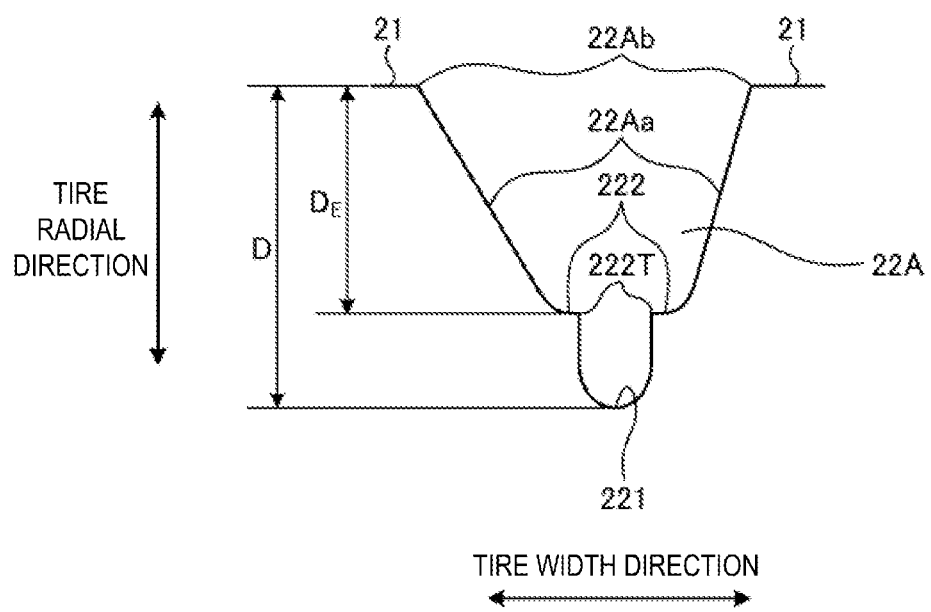
FIG. 9 is a meridian cross-sectional view illustrating a relationship between a groove depth of a main groove and a depth from a tread surface to a step portion.
Figure 10:
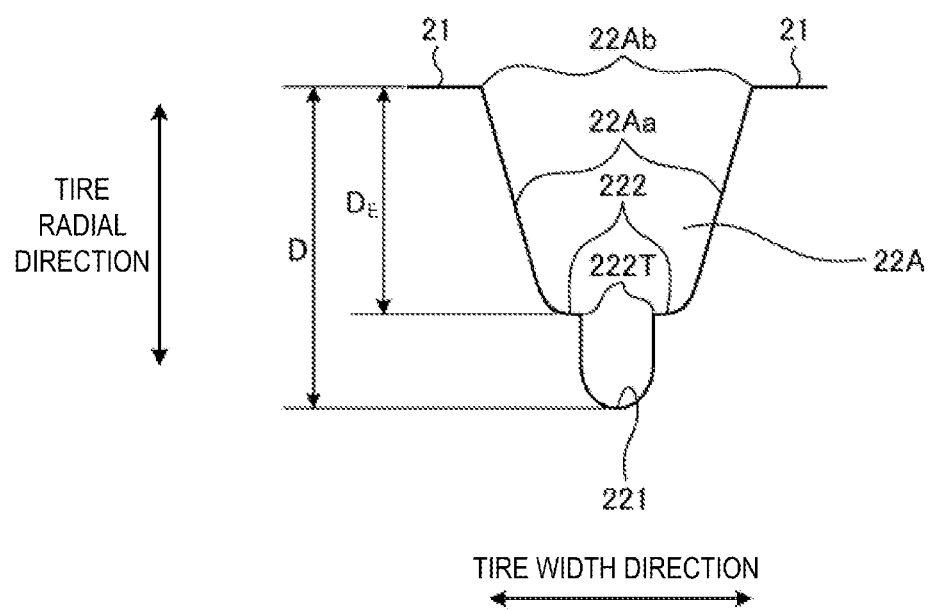
FIG. 10 is a meridian cross-sectional view illustrating a relationship between a groove depth of a main groove and a depth from a tread surface to a step portion.
Figure 11:
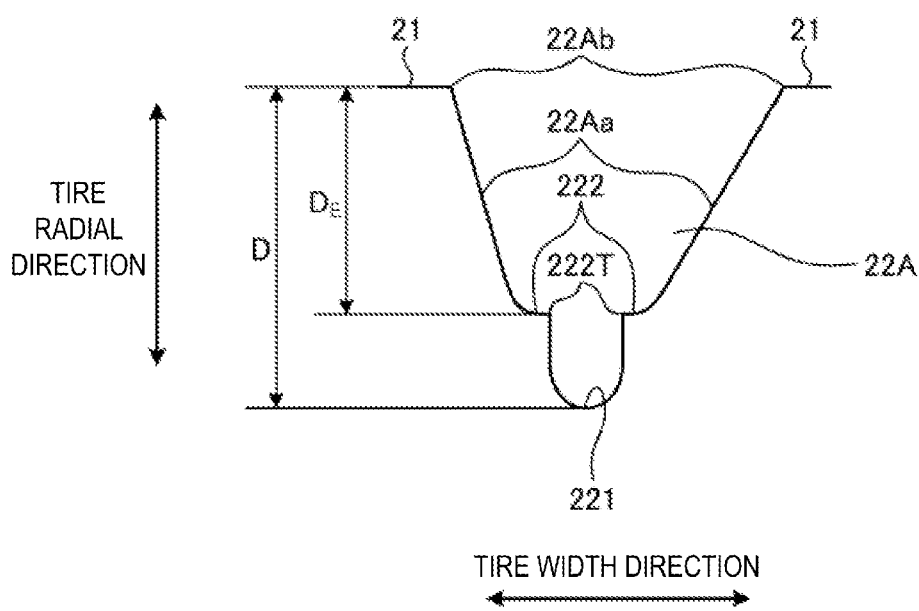
FIG. 11 is a meridian cross-sectional view illustrating a relationship between a groove depth of a main groove and a depth from a tread surface to a step portion.

FIGS. 9 to 11 are meridian cross-sectional views illustrating the relationship between the groove depth of the main groove 22A and the depth from the tread surface 21 to the step portion 222. In FIGS. 9 to 11, when the groove depth of the main groove 22A is D and the depth from the tread surface 21 to the step portion 222 which is the bend point where the groove wall angle changes is $D_E$, the ratio $D_E/D$ is preferably 0.60 or more and 0.80 or less. When the ratio $D_E/D$ is 0.60 or more and 0.80 or less, it means that the step portion 222 is provided in a range of from 60% to 80% wear of the tread surface 21. By providing the step portion 222 in this range, the rigidity of the block BK can be increased, and stones can be prevented from entering the main groove 22A to improve the stone drilling resistance performance. The maximum value of the groove depth D of the main groove 22A is, for example, 19.1 mm.

Modified Examples

Figure 12:
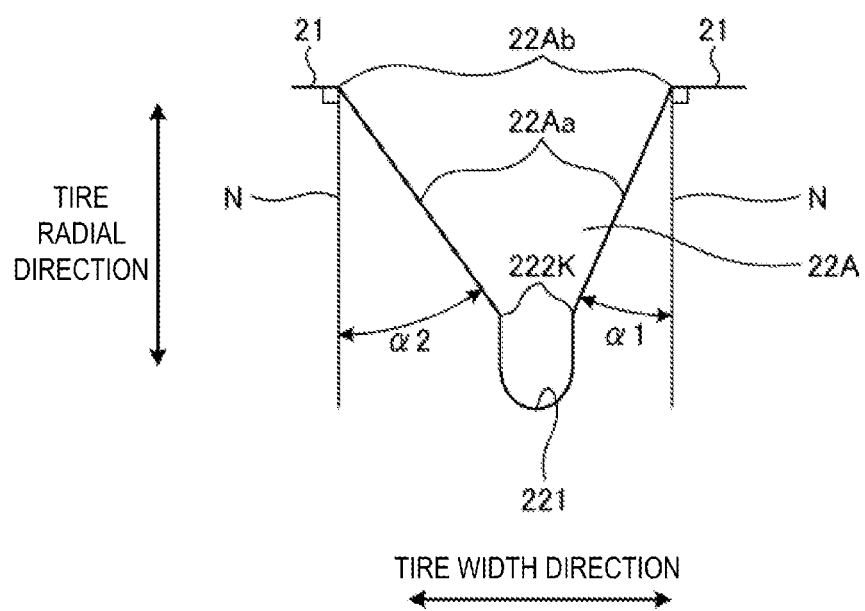
FIG. 12 is a diagram illustrating a modified example of a meridian cross-section of a main groove.

The main groove 22A is not limited to a shape having the step portion 222 in the meridian cross-section. For example, the main groove 22A may have a structure having a bend point in the groove wall. FIG. 12 is a diagram illustrating a modified example of the meridian cross-section of the main groove 22A. As illustrated in FIG. 12, the main groove 22A may have a bend point 222K in the meridian cross-section. The bend point 222K is visible as a ridge line 222R in FIG. 3, which is a plan view, similarly to the end portion 222T in FIG. 4.

In FIG. 12, the angle α1 of the groove wall 22Aa on the first block BK1 side of the main groove 22A with respect to the normal line N of the tread surface 21 is smaller than the angle α2 of the groove wall on the second block BK2 side of the main groove 22A with respect to the normal line N of the tread surface 21. By making the angle α2 of the groove wall 22Aa of the second block BK2 larger than the angle α1 of the groove wall 22Aa of the first block BK1, it is possible to suppress the collapse of the edge portion of the second block BK2 and improve the block rigidity.

In FIG. 12, the ratio W2/W1 of the distance W2 between the bend points 222K to the distance W1 between the groove opening end portions 22Ab is preferably 0.15 or more and 0.35 or less. When the ratio W2/W1 is within this range, the wear resistance and the stone drilling resistance performance can be improved. The ratio W2/W1 is more preferably 0.15 or more and 0.30 or less.

When the depth from the tread surface 21 to the bend point 222K where the groove wall angle changes is defined as $D_E$, the ratio $D_E/D$ is preferably 0.60 or more and 0.80 or less. When the ratio $D_E/D$ is 0.60 or more and 0.80 or less, it means that the bend point 222K is provided in a range of from 60% to 80% wear of the tread surface 21. By providing the bend point 222K in this range, the rigidity of the block BK can be increased, and stones can be prevented from entering the main groove 22A to improve the stone drilling resistance performance.

The above description has focused on the first block BK1 near the tire equator line CL and the second block BK2 adjacent to the first block BK1, but it is preferable that each block BK included in the land portions 20C, 20M1 and 20M2 of the tread portion 2 has the above-mentioned features. For example, even when the positions of the first block BK1 and the second block BK2 are exchanged and focused on, it is preferable that each block BK has the above-mentioned features. As a result, it is possible to improve the wear resistance performance and the stone drilling resistance performance of the tire.

EXAMPLES

In the present examples, performance tests for wear resistance performance and stone drilling resistance performance were performed on a plurality of types of tires with different conditions (see Tables 1 to 5). In these performance tests, a tire having a size 455/55R22.5 (heavy duty tire) was mounted on a 22.5 inch×14.00 inch rim and inflated to a standard maximum air pressure (900 kPa), and mounted on a drive shaft of a test vehicle (2-D tractor head), and the actual vehicle evaluation was performed in a state where a standard maximum load was applied.

Regarding the evaluation of wear resistance performance, the state of tire wear after traveling 100,000 km is expressed as an index value with Conventional Example being assigned as the reference (100). A greater index value indicates superior wear resistance performance.

Regarding the evaluation of stone drilling resistance performance, the state where stone drilling occurred in the circumferential main groove after traveling 100,000 km is expressed as an index value with Conventional Example being assigned as the reference (100). A greater index value indicates excellent stone drilling resistance performance.

The tires of Examples 1 to 45 in Tables 1 to 5 are tires which have a plurality of blocks defined by a main groove and a lug groove in the tread portion, and a step portion or a bent portion on a wall surface of the main groove and in which the angle θ1 is 90 degrees or more and 140 degrees or less, the angle θ2 is 40 degrees or more and 90 degrees or less, and the difference between the angles α1 and α2 is 3 degrees or more and 20 degrees or less. Further, the tires of Examples 1 to 45 are tires in which the ratio W2/W1 is 0.15 or more and 0.35 or less and not, the angle φ1 is 90 degrees or more and 150 degrees or less and not, the angle φ2 is 30 degrees or more and 80 degrees or less and not, the position of the midpoint of the section of length L2 is included in a position of 40% (0.4) to 60% (0.6) of the length L1 between one end portion and an other end portion of both end portions of the length L1 and not, the ratio L2/L1 is 0.15 or more and not, the difference between the angles β1 and β2 is 5 degrees or less and not, the difference between the angle θ1 and the angle φ1 is 0 degrees or more and 10 degrees or less and not, the difference between the angle θ3 and the angle φ3 is 20 degrees or more and 40 degrees or less and not, the ratio SD/SU is less than 0.5 and not, and the ratio of DE/D is 0.60 or more and 0.80 or less and not.

The tire of Conventional Example in Table 1 is a tire which has a plurality of blocks defined by a main groove and a lug groove in the tread portion, and in which the angle θ1 is 150 degrees, the angle θ2 is 100 degrees, and the difference between the angle α1 and the angle α2 of the groove wall is 0 degrees, that is, the angle α1 and the angle α2 are the same.

As can be understood from the test results in Tables 1 to 5, the tires of Examples have better wear resistance performance and stone drilling resistance performance.

TABLE 1-1

|  | Conventional Example | Example 1 | Example 2 | Example 3 |
|---|---|---|---|---|
| Angle θ1 (degrees) | 150 | 125 | 90 | 140 |
| Angle θ2 (degrees) | 100 | 60 | 60 | 60 |
| Difference between angles α1 and α2 (degrees) | 0 | 3 | 3 | 3 |
| Ratio W2/W1 | 0.30 | 0.30 | 0.30 | 0.30 |
| Angle φ1 (degrees) | 160 | 160 | 160 | 160 |
| Angle φ2 (degrees) | 130 | 130 | 130 | 130 |
| Length L2 section | 0.3 | 0.3 | 0.3 | 0.3 |
| Ratio L2/L1 | 0.70 | 0.70 | 0.70 | 0.70 |
| Difference between angles β1 and β2 (degrees) | 10 | 10 | 10 | 10 |
| Difference between angles θ1 and φ1 (degrees) | 15 | 15 | 15 | 15 |
| Difference between angles θ3 and φ3 (degrees) | 15 | 15 | 15 | 15 |
| Ratio SD/SU | 0.60 | 0.60 | 0.60 | 0.60 |
| Ratio $D_E/D$ | 0.50 | 0.50 | 0.50 | 0.50 |

TABLE 1-1-continued

|  | Conventional Example | Example 1 | Example 2 | Example 3 |
| --- | --- | --- | --- | --- |
| Wear resistance performance | 100 | 101 | 101 | 101 |
| Stone drilling resistance performance | 100 | 105 | 105 | 105 |

TABLE 1-2

|  | Example 4 | Example 5 | Example 6 | Example 7 | Example 8 |
| --- | --- | --- | --- | --- | --- |
| Angle $\theta_1$ (degrees) | 125 | 125 | 125 | 125 | 125 |
| Angle $\theta_2$ (degrees) | 40 | 90 | 60 | 60 | 60 |
| Difference between angles $\alpha_1$ and $\alpha_2$ (degrees) | 3 | 3 | 3 | 5 | 15 |
| Ratio W2/W1 | 0.30 | 0.30 | 0.30 | 0.30 | 0.30 |
| Angle $\varphi_1$ (degrees) | 160 | 160 | 160 | 160 | 160 |
| Angle $\varphi_2$ (degrees) | 130 | 130 | 130 | 130 | 130 |
| Length L2 section | 0.3 | 0.3 | 0.3 | 0.3 | 0.3 |
| Ratio L2/L1 | 0.70 | 0.70 | 0.70 | 0.70 | 0.70 |
| Difference between angles $\beta_1$ and $\beta_2$ (degrees) | 10 | 10 | 10 | 10 | 10 |
| Difference between angles $\theta_1$ and $\varphi_1$ (degrees) | 15 | 15 | 15 | 15 | 15 |
| Difference between angles $\theta_3$ and $\varphi_3$ (degrees) | 15 | 15 | 15 | 15 | 15 |
| Ratio SD/SU | 0.60 | 0.60 | 0.60 | 0.60 | 0.60 |
| Ratio $D_E/D$ | 0.50 | 0.50 | 0.50 | 0.50 | 0.50 |
| Wear resistance performance | 101 | 101 | 102 | 103 | 105 |
| Stone drilling resistance performance | 105 | 105 | 105 | 105 | 105 |

TABLE 2-1

|  | Example 9 | Example 10 | Example 11 | Example 12 | Example 13 |
| --- | --- | --- | --- | --- | --- |
| Angle $\theta_1$ (degrees) | 125 | 125 | 125 | 125 | 125 |
| Angle $\theta_2$ (degrees) | 60 | 60 | 60 | 60 | 60 |
| Difference between angles $\alpha_1$ and $\alpha_2$ (degrees) | 20 | 25 | 15 | 15 | 15 |
| Ratio W2/W1 | 0.30 | 0.30 | 0.10 | 0.15 | 0.25 |
| Angle $\varphi_1$ (degrees) | 160 | 160 | 160 | 160 | 160 |
| Angle $\varphi_2$ (degrees) | 130 | 130 | 130 | 130 | 130 |
| Length L2 section | 0.3 | 0.3 | 0.3 | 0.3 | 0.3 |
| Ratio L2/L1 | 0.70 | 0.70 | 0.70 | 0.70 | 0.70 |
| Difference between angles $\beta_1$ and $\beta_2$ (degrees) | 10 | 10 | 10 | 10 | 10 |
| Difference between angles $\theta_1$ and $\varphi_1$ (degrees) | 15 | 15 | 15 | 15 | 15 |
| Difference between angles $\theta_3$ and $\varphi_3$ (degrees) | 15 | 15 | 15 | 15 | 15 |
| Ratio SD/SU | 0.60 | 0.60 | 0.60 | 0.60 | 0.60 |
| Ratio $D_E/D$ | 0.50 | 0.50 | 0.50 | 0.50 | 0.50 |
| Wear resistance performance | 103 | 103 | 105 | 105 | 105 |
| Stone drilling resistance performance | 105 | 105 | 105 | 106 | 108 |

TABLE 2-2

|  | Example 14 | Example 15 | Example 16 | Example 17 |
| --- | --- | --- | --- | --- |
| Angle $\theta_1$ (degrees) | 125 | 125 | 125 | 125 |
| Angle $\theta_2$ (degrees) | 60 | 60 | 60 | 60 |
| Difference between angles $\alpha_1$ and $\alpha_2$ (degrees) | 15 | 15 | 15 | 15 |
| Ratio W2/W1 | 0.40 | 0.25 | 0.25 | 0.25 |
| Angle $\varphi_1$ (degrees) | 160 | 60 | 90 | 120 |
| Angle $\varphi_2$ (degrees) | 130 | 130 | 130 | 130 |
| Length L2 section | 0.3 | 0.3 | 0.3 | 0.3 |
| Ratio L2/L1 | 0.70 | 0.70 | 0.70 | 0.70 |
| Difference between angles $\beta_1$ and $\beta_2$ (degrees) | 10 | 10 | 10 | 10 |
| Difference between angles $\theta_1$ and $\varphi_1$ (degrees) | 15 | 15 | 15 | 15 |
| Difference between angles $\theta_3$ and $\varphi_3$ (degrees) | 15 | 15 | 15 | 15 |
| Ratio SD/SU | 0.60 | 0.60 | 0.60 | 0.60 |
| Ratio $D_E/D$ | 0.50 | 0.50 | 0.50 | 0.50 |
| Wear resistance performance | 105 | 105 | 106 | 108 |
| Stone drilling resistance performance | 106 | 108 | 108 | 108 |

TABLE 3-1

|  | Example 18 | Example 19 | Example 20 | Example 21 | Example 22 |
| --- | --- | --- | --- | --- | --- |
| Angle $\theta_1$ (degrees) | 125 | 125 | 125 | 125 | 125 |
| Angle $\theta_2$ (degrees) | 60 | 60 | 60 | 60 | 60 |
| Difference between angles $\alpha_1$ and $\alpha_2$ (degrees) | 15 | 15 | 15 | 15 | 15 |
| Ratio W2/W1 | 0.25 | 0.25 | 0.25 | 0.25 | 0.25 |
| Angle $\varphi_1$ (degrees) | 150 | 160 | 160 | 160 | 160 |
| Angle $\varphi_2$ (degrees) | 130 | 10 | 20 | 40 | 60 |
| Length L2 section | 0.3 | 0.3 | 0.3 | 0.3 | 0.3 |
| Ratio L2/L1 | 0.70 | 0.70 | 0.70 | 0.70 | 0.70 |
| Difference between angles $\beta_1$ and $\beta_2$ (degrees) | 10 | 10 | 10 | 10 | 10 |
| Difference between angles $\theta_1$ and $\varphi_1$ (degrees) | 15 | 15 | 15 | 15 | 15 |
| Difference between angles $\theta_3$ and $\varphi_3$ (degrees) | 15 | 15 | 15 | 15 | 15 |
| Ratio SD/SU | 0.60 | 0.60 | 0.60 | 0.60 | 0.60 |
| Ratio $D_E/D$ | 0.50 | 0.50 | 0.50 | 0.50 | 0.50 |
| Wear resistance performance | 106 | 106 | 109 | 111 | 109 |
| Stone drilling resistance performance | 108 | 108 | 108 | 108 | 108 |

TABLE 3-2

|  | Example 23 | Example 24 | Example 25 | Example 26 | Example 27 |
| --- | --- | --- | --- | --- | --- |
| Angle $\theta_1$ (degrees) | 125 | 125 | 125 | 125 | 125 |
| Angle $\theta_2$ (degrees) | 60 | 60 | 60 | 60 | 60 |
| Difference between angles $\alpha_1$ and $\alpha_2$ (degrees) | 15 | 15 | 15 | 15 | 15 |
| Ratio W2/W1 | 0.25 | 0.25 | 0.25 | 0.25 | 0.25 |
| Angle $\varphi_1$ (degrees) | 160 | 160 | 160 | 160 | 120 |
| Angle $\varphi_2$ (degrees) | 40 | 40 | 40 | 40 | 40 |

TABLE 3-2-continued

|  | Example 23 | Example 24 | Example 25 | Example 26 | Example 27 |
|---|---|---|---|---|---|
| Length L2 section | 0.4 | 0.5 | 0.6 | 0.7 | 0.5 |
| Ratio L2/L1 | 0.70 | 0.70 | 0.70 | 0.70 | 0.10 |
| Difference between angles β1 and β2 (degrees) | 10 | 10 | 10 | 10 | 10 |
| Difference between angles θ1 and φ1 (degrees) | 15 | 15 | 15 | 15 | 15 |
| Difference between angles θ3 and φ3 (degrees) | 15 | 15 | 15 | 15 | 15 |
| Ratio SD/SU | 0.60 | 0.60 | 0.60 | 0.60 | 0.60 |
| Ratio $D_E/D$ | 0.50 | 0.50 | 0.50 | 0.50 | 0.50 |
| Wear resistance performance | 112 | 114 | 112 | 111 | 114 |
| Stone drilling resistance performance | 108 | 108 | 108 | 108 | 108 |

TABLE 4-1

|  | Example 28 | Example 29 | Example 30 | Example 31 | Example 32 |
|---|---|---|---|---|---|
| Angle θ1 (degrees) | 125 | 125 | 125 | 125 | 125 |
| Angle θ2 (degrees) | 60 | 60 | 60 | 60 | 60 |
| Difference between angles α1 and α2 (degrees) | 15 | 15 | 15 | 15 | 15 |
| Ratio W2/W1 | 0.25 | 0.25 | 0.25 | 0.25 | 0.25 |
| Angle φ1 (degrees) | 120 | 120 | 120 | 120 | 120 |
| Angle φ2 (degrees) | 40 | 40 | 40 | 40 | 40 |
| Length L2 section | 0.5 | 0.5 | 0.5 | 0.5 | 0.5 |
| Ratio L2/L1 | 0.15 | 0.20 | 0.40 | 0.20 | 0.35 |
| Difference between angles β1 and β2 (degrees) | 10 | 10 | 10 | 3 | 5 |
| Difference between angles θ1 and φ1 (degrees) | 15 | 15 | 15 | 15 | 15 |
| Difference between angles θ3 and φ3 (degrees) | 15 | 15 | 15 | 15 | 15 |
| Ratio SD/SU | 0.60 | 0.60 | 0.60 | 0.60 | 0.60 |
| Ratio $D_E/D$ | 0.50 | 0.50 | 0.50 | 0.50 | 0.50 |
| Wear resistance performance | 115 | 116 | 115 | 118 | 117 |
| Stone drilling resistance performance | 108 | 108 | 108 | 108 | 108 |

TABLE 4-2

|  | Example 33 | Example 34 | Example 35 | Example 36 |
|---|---|---|---|---|
| Angle θ1 (degrees) | 125 | 125 | 125 | 125 |
| Angle θ2 (degrees) | 60 | 60 | 60 | 60 |
| Difference between angles α1 and α2 (degrees) | 15 | 15 | 15 | 15 |
| Ratio W2/W1 | 0.25 | 0.25 | 0.25 | 0.25 |
| Angle φ1 (degrees) | 120 | 120 | 120 | 120 |
| Angle φ2 (degrees) | 40 | 40 | 40 | 40 |
| Length L2 section | 0.5 | 0.5 | 0.5 | 0.5 |
| Ratio L2/L1 | 0.35 | 0.35 | 0.35 | 0.35 |
| Difference between angles β1 and β2 (degrees) | 10 | 3 | 3 | 3 |
| Difference between angles θ1 and φ1 (degrees) | 15 | 15 | 5 | 5 |
| Difference between angles θ3 and φ3 (degrees) | 15 | 15 | 15 | 15 |
| Ratio SD/SU | 0.60 | 0.60 | 0.60 | 0.60 |
| Ratio $D_E/D$ | 0.50 | 0.50 | 0.50 | 0.50 |
| Wear resistance performance | 116 | 118 | 119 | 119 |
| Stone drilling resistance performance | 108 | 108 | 108 | 108 |

The invention claimed is:

1. A tire, comprising:
a plurality of main grooves extending in a tire circumferential direction;
a land portion defined by the main grooves;
a plurality of lug grooves passing through the land portion; and
a plurality of blocks defined by the plurality of main grooves and the plurality of lug grooves,
each of the plurality of blocks including at least one bend point and having a bent shape that projects inward of the blocks,
the main grooves having a bend point at which an angle of a groove wall with respect to a normal line of a tread surface changes in a meridian cross-section, and
in a first block and a second block, among the plurality of blocks, that are adjacent to each other in a tire width direction with one of the main grooves interposed therebetween,
in a plan view of the tread surface, an angle between a line extended from a ridge line formed by the bend point of a groove wall on a first block side of the one of the main grooves between the first block and the second block and a line extended from a groove wall of the one of the lug grooves defining the first block being larger than an angle between a line extended from a ridge line formed by the bend point of a groove wall on a second block side of the one of the main grooves between the first block and the second block and a line extended from a groove wall of the one of the lug grooves defining the second block, and
in a meridian cross-section, an angle of the groove wall on the first block side of the one of the main grooves between the first block and the second block with respect to a normal line of the tread surface being smaller than an angle of the groove wall on the second block side of the one of the main grooves between the first block and the second block with respect to a normal line of the tread surface,
wherein, in a plan view of the tread surface, a ratio L2/L1 of a length L2 of a section in which an angle of a groove wall on the first block side of the one of the main grooves is constant with respect to a length L1 in the tire circumferential direction of an edge on the second block side of a road contact surface of the first block is 0.15 or more and 0.70 or less, and a position of a midpoint of the section having length L2 is included in a position of 40% to 60% of the length L1 between one end portion and an other end portion of both end portions of the length L1.

2. The tire according to claim 1, wherein, in a plan view of the tread surface, a ratio of a distance between the ridge lines of main groove wall surfaces to a maximum distance between opposing main groove wall surfaces is 0.15 or more and 0.35 or less.

3. The tire according to claim 1, wherein, in a plan view of the tread surface, an angle between a line extended from an end portion on the first block side of the one of the main grooves and a line extended from a groove wall of the one of the lug grooves defining the first block is 90 degrees or more and 150 degrees or less, and an angle between a line extended from an end portion on the second block side of the one of the main grooves and a line extended from a groove wall of the one of the lug grooves defining the second block is 20 degrees or more and 60 degrees or less.

4. The tire according to claim 1, wherein, in a meridian cross-section, a difference in angle of the groove walls on both sides in an extension direction of the one of the main grooves in the section of length L2 is 5 degrees or less.

5. The tire according to claim 1, wherein
a first lug groove and a second lug groove are adjacent to each other in the tire circumferential direction with the first block interposed therebetween,
in a plan view of the tread surface, a difference between an angle between a line extended from a ridge line of a groove wall on the first block side of the one of the main grooves between the first block and the second block and a line extended from a groove wall of the first lug groove and an angle between a line extended from an end portion on the first block side of the one of the main grooves and a line extended from a groove wall of the first lug groove is 0 degrees or more and 10 degrees or less, and
in a plan view of the tread surface, a difference between an angle between a line extended from a ridge line of a groove wall on the first block side of the one of the main grooves between the first block and the second block and a line extended from a groove wall of the second lug groove and an angle between a line extended from an end portion on the first block side of the one of the main grooves and a line extended from a groove wall of the second lug groove is 20 degrees or more and 40 degrees or less.

6. The tire according to claim 1, wherein in a meridian cross-section, when a groove depth of the one of the main grooves is D, and an imaginary dividing line parallel with a straight line that connects groove opening end portions is drawn to a position at D/2 so that an outer side in a tire radial direction and an inner side in the tire radial direction are divided, a ratio SD/SU of a cross-sectional area SD on the inner side in the tire radial direction to a cross-sectional area SU on the outer side in the tire radial direction is less than 0.5.

7. The tire according to claim 1, wherein, in a meridian cross-section, when a groove depth of the one of the main grooves is D and a depth from the tread surface to the bend point is DE, a ratio DE/D is 0.60 or more and 0.80 or less.

8. The tire according to claim 2, wherein, in a plan view of the tread surface, an angle between a line extended from an end portion on the first block side of the one of the main grooves and a line extended from a groove wall of the one of the lug grooves defining the first block is 90 degrees or more and 150 degrees or less, and an angle between a line extended from an end portion on the second block side of the one of the main grooves and a line extended from a groove wall of the one of the lug grooves defining the second block is 20 degrees or more and 60 degrees or less.

9. The tire according to claim 8, wherein, in a meridian cross-section, a difference in angle of the groove walls on both sides in an extension direction of the one of the main grooves in the section of length L2 is 5 degrees or less.

10. The tire according to claim 9, wherein
a first lug groove and a second lug groove are adjacent to each other in the tire circumferential direction with the first block interposed therebetween,
in a plan view of the tread surface, a difference between an angle between a line extended from a ridge line of a groove wall on the first block side of the one of the main grooves between the first block and the second block and a line extended from a groove wall of the first lug groove and an angle between a line extended from an end portion on the first block side of the one of the main grooves and a line extended from a groove wall of the first lug groove is 0 degrees or more and 10 degrees or less, and
in a plan view of the tread surface, a difference between an angle between a line extended from a ridge line of a groove wall on the first block side of the one of the main grooves between the first block and the second block and a line extended from a groove wall of the second lug groove and an angle between a line extended from an end portion on the first block side of the one of the main grooves and a line extended from a groove wall of the second lug groove is 20 degrees or more and 40 degrees or less.

11. The tire according to claim 10, wherein in a meridian cross-section, when a groove depth of the one of the main grooves is D, and an imaginary dividing line parallel with a straight line that connects groove opening end portions is drawn to a position at D/2 so that an outer side in the tire radial direction and an inner side in the tire radial direction are divided, a ratio SD/SU of a cross-sectional area SD on the inner side in the tire radial direction to a cross-sectional area SU on the outer side in the tire radial direction is less than 0.5.

12. The tire according to claim 11, wherein, in a meridian cross-section, when the groove depth of the one of the main grooves is D and a depth from the tread surface to the bend point is DE, a ratio DE/D is 0.60 or more and 0.80 or less.

13. A tire, comprising:
a plurality of main grooves extending in a tire circumferential direction;
a land portion defined by the main grooves;
a plurality of lug grooves passing through the land portion; and
a plurality of blocks defined by the plurality of main grooves and the plurality of lug grooves,
each of the plurality of blocks including at least one bend point and having a bent shape that projects inward of the blocks,
the main grooves having a bend point at which an angle of a groove wall with respect to a normal line of a tread surface changes in a meridian cross-section, and
in a first block and a second block, among the plurality of blocks, that are adjacent to each other in a tire width direction with one of the main grooves interposed therebetween,
in a plan view of the tread surface, an angle between a line extended from a ridge line formed by the bend point of a groove wall on a first block side of the one of the main grooves between the first block and the second block and a line extended from a groove wall of the one of the lug grooves defining the first block being larger than an angle between a line extended from a ridge line formed by the bend point of a groove wall on a second block side of the one of the main grooves between the first block and the second block and a line extended from a groove wall of the one of the lug grooves defining the second block, and in a meridian cross-section, an angle of the groove wall on the first block side of the one of the main grooves between the first block and the second block with respect to a normal line of the tread surface being smaller than an angle of the groove wall on the second block side of the one of the main grooves between the first block and the second block with respect to a normal line of the tread surface, wherein a first lug groove and a second lug groove are adjacent to each other in the tire circumferential direction with the first block interposed therebetween, in a plan view of the tread surface, a difference between an angle between a line extended from a ridge line of a groove wall on the first block side of the one of the main grooves between the first block and the second block and a line extended from a groove wall of the first lug groove and an angle between a line extended from an end portion on the first block side of the one of the main grooves and a line extended from a groove wall of the first lug groove is 0 degrees or more and 10 degrees or less, and in a plan view of the tread surface, a difference between an angle between a line extended from a ridge line of a groove wall on the first block side of the one of the main grooves between the first block and the second block and a line extended from a groove wall of the second lug groove and an angle between a line extended from an end portion on the first block side of the one of the main grooves and a line extended from a groove wall of the second lug groove is 20 degrees or more and 40 degrees or less.

* * * * *